Patented Aug. 9, 1932

1,870,319

UNITED STATES PATENT OFFICE

YOSHITARO TAKAYAMA, OF TOKYO, JAPAN

METHOD OF SEPARATING BETAINE HYDROCHLORIDE AND POTASSIUM CHLORIDE FROM WASTE MOLASSES

No Drawing. Application filed March 10, 1928, Serial No. 260,806, and in Japan November 15, 1927.

This invention relates to a method of separating pure betaine hydrochloride and potassium chloride, consisting in a combination of a first stage of operation in which, when betaine hydrochloride is separated from the waste liquor of beet molasses or waste liquor produced in distilling alcohol from fermented beet molasses, the crude potassium chloride is crystallized by passing hydrochloric acid gas or adding hydrochloric acid to the concentrated raw material and the same is filtered and then crystals of the crude betaine hydrochloride containing the potassium chloride crystallized are collected by concentrating the filtrate with a second stage of operation in which potassium chloride is separated by neutralizing the crude betaine hydrochloride containing the said potassium chloride with lime or calcium carbonate and then betaine is separated from the filtrate in the form of hydrochloride. The object of this invention is to obtain pure potassium chloride as well as pure betaine hydrochloride easily at small cost by separating potassium salt and betaine hydrochloride without necessitating the use of a solvent like methyl or ethyl alcohol in the method of extraction.

The waste liquor of beet molasses contain potassium salt, betaine, glutamic acid and other various organic compounds, and if hydrochloric acid gas or hydrochloride is made to act upon the concentrated raw material, crystals of potassium chloride will be produced. Then, if it is filtered and the filtrate is concentrated, crystals of the crude betaine hydrochloride containing potassium chloride will be obtained. Filter the same, and the filtrate can be employed as the raw material of glutamic acid.

Now, it is customary to extract the pure betaine hydrochloride not containing ash from the above crude betaine hydrochloride, containing potassium chloride, with such a solvent as ordinary methyl or ethyl alcohol, etc., but it is inconvenient and uneconomical when it contains a comparatively large quantity of potassium chloride. However, according to my invention the separation and refining can be easily effected by using calcium carbonate or lime instead of the above-mentioned solvents.

In the present invention, crystals of the crude betaine hydrochloride containing potassium chloride are dissolved in water and the solution is neutralized with calcium carbonate or lime, thus converting the same into potassium chloride and free betaine, which may then be concentrated to crystallize potassium chloride. The crystals are next filtered, and betaine hydrochloride are separated by adding hydrochloric acid to the filtrate or in its stead adding sulphuric acid for removing as calcium sulphate the lime dissolved in the form of calcium chloride and at the same time converting betaine into betaine hydrochloride.

The following is an example of carrying this invention into practice:—

1. Add about 400 grams of strong hydrochloric acid to 1 kilogram of concentrated waste liquor of beet molasses and hold the same at 100° C. for nearly an hour. Leave it to cool and filter the crystals of potassium chloride thus produced. Then, concentrate the filtrate, and crystals of crude betaine hydrochloride containing potassium chloride will be obtained. Next, filter the same, and about 120–150 grams of it will be obtained. Dissolve it in about three times the quantity of water. If the solution is neutralized with lime or calcium carbonate and filtered and the filtrate is concentrated as much as possible up to about 23½° Baumé, crystals of potassium chloride will be produced. Filter the same and add hydrochloric acid to the filtrate. Then, concentrate it up to about 28° Bé., and crystals of betaine hydrochloride hardly containing ash will be obtained. Further, if necessary, recrystallize it from the water, and commercial pure potassium chloride as well as pure betaine hydrochloride will be obtained. By the way, according to this method the same quantity of betaine hydrochloride containing 0.62% of ash, can be obtained as by the alcohol method without re-crystallization from betaine hydrochloride containing 27% of potassium chloride and mineral matters, and pure betaine hydrochloride can be obtained easily by re-crystallization. To give a more specific example, betaine hydrochloride containing 0.61% of ash can be obtained from betaine hydrochloride containing 55.6% of ash, and at the same time almost colorless potassium chloride containing more than 98% of KCl can be obtained. Then, if this potassium chloride is recrystallized, chemically pure potassium chloride will be obtained.

2. Almost the same result may be obtained if in the above example dilute sulphuric acid instead of hydrochloric acid is added to the liquid from which potassium chloride is filtered, thus converting into calcium sulphate the calcium compound dissolved in the form of calcium chloride and at the same time betaine into hydrochloride, and the calcium sulphate precipitated is removed and crystals of betaine hydrochloride are separated and recrystallized by concentrating the filtrate.

I claim:

1. The method of treating waste liquor of beet molasses consisting in treating the waste liquor to crystallize the crude betaine hydrochloride containing potassium chloride; neutralizing a water solution of the said crude crystals with lime; filtering the solution; and concentrating the filtrate to crystallize the potassium chloride.

2. The method of treating waste liquor of beet molasses consisting in treating the waste liquor to crystallize the crude betaine hydrochloride containing potassium chloride; neutralizing a water solution of the crude betaine hydrochloride containing potassium chloride with lime so as to convert betaine hydrochloride into free betaine; concentrating the solution to crystallize the potassium chloride; then filtering the solution and re-concentrating the filtrate; and adding an acid which will crystallize the betaine hydrochloride.

3. The method of treating waste liquor of beet molasses consisting in treating the concentrated waste liquor with hydrochloric acid; removing the potassium chloride crystals by filtration; concentrating the filtrate to crystallize the crude betaine hydrochloride containing potassium chloride; neutralizing a water solution of the crystallized crude betaine hydrochloride with lime; filtering the solution and concentrating the filtrate to crystallize the potassium chloride.

4. The method of treating waste liquor of beet molasses, consisting in treating the concentrated waste liquor with hydrochloric acid; removing the potassium chloride crystals by filtration; concentrating the filtrate to crystallize the crude betaine hydrochloride containing potassium chloride; neutralizing a water solution of the crystallized crude betaine hydrochloride with lime; filtering the solution and concentrating the filtrate to crystallize the potassium chloride; then re-filtering and reconcentrating the filtrate; and regenerating the betaine hydrochloride by addition of a strong inorganic acid and crystallizing the same.

5. The method of treating waste liquor of beet molasses consisting in crystallizing the potassium chloride by passing hydrochloric acid gas through the waste liquor; then filtering to remove the crystals; concentrating the filtrate to crystallize the crude betaine hydrochloride containing potassium chloride; neutralizing a water solution of the crystallized crude betaine hydrochloride with lime to free the betaine, and then crystallizing the potassium chloride.

6. The method of treating waste liquor of beet molasses consisting in crystallizing the potassium chloride by passing hydrochloric acid gas through the waste liquor; then filtering to remove the crystals; concentrating the filtrate to crystallize the crude betaine hydrochloride containing potassium chloride; neutralizing a water solution of the crystallized crude betaine hydrochloride with lime; filtering the solution and concentrating the filtrate to crystallize the potassium chloride.

7. The method of treating waste liquor of beet molasses consisting in crystallizing the potassium chloride by passing hydrochloric acid through the concentrated waste liquor; then filtering to remove the crystals; concentrating the filtrate to crystallize the crude betaine hydrochloride containing potassium chloride; neutralizing a water solution of the crystallized crude betaine hydrochloride with calcium carbonate to liberate betaine and concentrating the solution to crystallize the potassium chloride; then filtering the solution and re-concentrating the filtrate; and crystallizing the betaine hydrochloride by addition of a strong mineral acid.

8. The method of treating waste liquor of beet molasses consisting in crystallizing the potassium chloride by passing strong hydrochloric acid through the concentrated waste liquor; then filtering to remove the crystals; concentrating the filtrate to crystallize the crude betaine hydrochloride containing potassium chloride; neutralizing a water solution of the crystallized crude betaine hydrochloride with calcium carbonate to liberate betaine and concentrating the solution to crystallize the potassium chloride; then filtering and re-concentrating the filtrate; and regenerating the betaine hydrochloride by addition of a strong inorganic acid, and crystallizing the same.

YOSHITARO TAKAYAMA.